April 28, 1942.                M. STÖSSEL                2,280,865
PRODUCTION OF SPRAY METAL NEGATIVES OF MODELS
Filed May 29, 1940

INVENTOR
Max Stössel
BY Ralph Dinklage
ATTORNEY

Patented Apr. 28, 1942

2,280,865

UNITED STATES PATENT OFFICE 2,280,865

PRODUCTION OF SPRAY METAL NEGATIVES OF MODELS

Max Stössel, New York, N. Y., assignor to Otto Stossel, Chicago, Ill.

Original application May 22, 1939, Serial No. 274,951. Divided and this application May 29, 1940, Serial No. 337,789. In Great Britain January 11, 1938

6 Claims. (Cl. 22—190)

The invention relates to the production of spray metal negatives of models, and particularly the production of molds, dies, patterns, or the like, of the type that are particularly useful in the casting or molding of plastics such as synthetic resins, rubber, Celluloid, or glass and the like. This is a division of my application Serial No. 274,951, filed May 22, 1939.

At the present, molds for this use are generally produced by cutting the molds from solid metal blocks by means of machining and engraving tools. This method involves considerable time and expense and is not commercially practicable for low-cost production, except when the molds thus made are used in mass production, where the cost of the mold can be distributed over numerous products made therefrom. Even then the length of time necessary to produce a mold is a material drawback.

A few attempts have been made to produce molds for this work by spraying metal upon a model or a positive and thus forming a mold or negative. Such attempts were unsuccessful because of distortion and inaccuracy and the tendency of the sprayed metal to peel off the model, particularly when spraying with metals having a fusion point above 600° C. This tendency to peel is apparently due to uneven thermal stresses produced in the metal when it is sprayed upon the model and is particularly prevalent when the metal is sprayed to a thickness exceeding 0.1 millimeter, or 0.0025 inch. This "peeling" makes it impossible in many cases to directly spray an accurate negative or mold having sufficient strength or rigidity for any practical use.

Further such difficulties are encountered when the model of the article to be reproduced is formed of some relatively soft material such as wood, plaster-of-Paris or many of the fibrous materials used to make models. In all such instances, therefore, the model does not permit the direct spraying thereonto of a spray metal of relative hardness, and/or high fusion point, to provide a usable negative or mold.

It is the purpose of my present invention to produce an accurate and usable negative or mold economically and commercially by spraying a model, either the original or a reproduced model, in such a manner as to overcome the heretofore mentioned difficulties, as well as other defects and limitations.

Further objects and their resultant advantages will be apparent from the following description taken in connection with the following drawing in which.

In accordance with the invention, a first negative or mold is made of a metal of low melting point, such as tin, zinc or cadmium, by spraying such metals onto the model to be reproduced. The negative or mold made in this manner is then used for the production, by metal spraying, of a second or duplicate model or positive of a higher melting point metal from which a second negative or final mold may be made.

Figure 1:
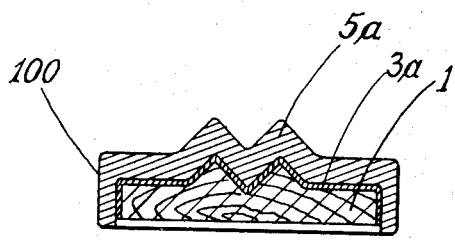
Fig. 1 is a cross-sectional side elevation of a model having superimposed low and higher melting point spray metal layers.

Referring to the drawing the first negative or mold may be made, for instance, as follows: As illustrated (Fig. 1), a model 1, of for example wood, is to be reproduced. This model is the first or master model and may be roughened, if desired, by any suitable means, such as sanding or sandblasting. The model is coated with a layer 3a of tin or other suitable metal of low melting point by spraying the top and sides of the model as shown in Fig. 1. Additional layers 5a of zinc or similar material are sprayed over the entire coated model so as to completely cover the coated model. The layers 5a of zinc may be increased to any desired thickness by repeated sprayings to form a negative or mold of satisfactory strength. After the zinc has reached the desired thickness, the negative or mold made up of the layer 3a of tin and layers 5a of zinc, is separated from the positive or master model 1 and the flashing or rim 100 may be removed, if desired, by any suitable method, such as chiseling or milling.

Figure 2:
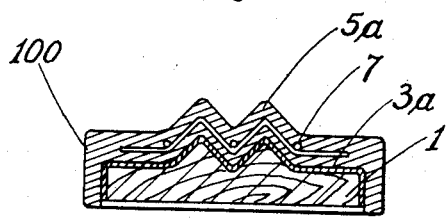
Fig. 2 is a cross-sectional side elevation of a structure as shown in Fig. 1 having additionally a wire form embedded in spray metal.

If desired, a strengthening cage or wire form 7 (Fig. 2), shaped as closely as possible to the form of the model, may be embedded in the spray metal coating by placing such cage on the coated model and thereafter spraying additional layers of spray metal over the coated model and form. Because of the added rigidity of the wire 7 the negative or mold is further strengthened.

The negative or first mold produced by either of the foregoing methods, i. e., with or without the reinforcing wire form 7, is then used in the following manner for the production of a second model, it being understood, of course, as previously stated, that the first or master model was of such material that it could not be sprayed with a hard metal or a metal of high melting point in the first instance.

Figure 3:
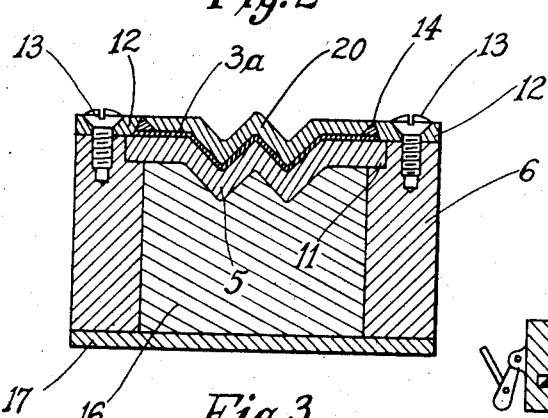
Fig. 3 is a cross-sectional side elevation of the spray metal layers shown in Fig. 1 mounted in a frame and having a superimposed further spray metal layer.

It is preferred to place the first mold in a frame support 6 (Fig. 3) in order to insure against possible deformation or distortion of the first mold which is of relatively soft metal, during the production of a second model, or the reproduction of the master model. The frame support 6 (Fig. 3) has its upper edge channeled at 11 to receive the edge portion of the mold 5; an upper clamping plate or frame 12, preferably of sufficient width to overlap the top surface of the mold, may be secured to the frame support by screws 13 or by any other suitable means. The inner edge of the plate or frame 12 may be beveled as at 14 and is preferably roughened in any suitable manner.

It is preferred to further support the mold 5 by filling the frame support 6 beneath the mold 5 with some supporting material such as metal or sand 16 and to close the frame support with a bottom plate 17. In this manner the first negative or mold is securely and rigidly supported against any possible distortion or deformation during the production of the second positive or model or the reproduction of articles like the master model.

The layer 3a of tin or other low melting point metal remains on the inner surface of the first negative or mold 5 after its removal from the model, thus presenting a suitable surface for the next succeeding application of spray metal. It is desirable to coat the beveled edge 14 of the plate or frame 12 (Fig. 3) with tin to facilitate separation of the second positive from the first mold. This may be done by spraying, dipping or plating. The inner surface of the first negative or mold 5 is then sprayed with successive layers 20 of a harder metal of higher melting point, such as bronze, than the metal of the mold, until a second positive or model of the desired thickness of the metal 20 has been formed. It is of advantage to apply these latter layers of metal 20 by first spraying a thin layer over the entire inner surface of the mold and against the inner sloping edge 14 of the plate or frame 12, after which the metal 20 is preferably thickened around the marginal edge and against the edge 14. In this way, the final layers are retained and held in contact with the mold, i. e., the metal is prevented from peeling or separating from the surface of the first mold 5. As previously stated, additional layers of the harder metal may be sprayed on until any desired thickness has been reached, preferably until the center is as thick as the edge. Ordinarily, a thickness of 0.25 to 0.4 inch is sufficient to give the desired and necessary strength to the second positive or model.

After a second positive or model of the desired thickness or strength of metal 20 has been prepared, it may be removed from the first mold by heating them to the melting point of the low melting point metal. In the specific embodiment illustrated in the drawing, the layer 3a of tin is so heated, thus severing the bond between the second positive or model, composed of the relatively harder metal 20, and the first negative or mold 5, permitting the two to be readily separated. After separation, the second positive or model 20 is preferably carefully cleaned by brushing while still hot, dipping into an acid or by any other suitable method.

Figure 4:
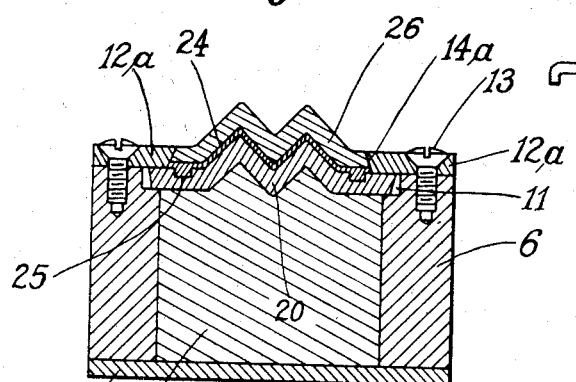
Fig. 4 is a cross-sectional side elevation of a spray metal coat formed on a model with the interposition of a thin layer of a low melting point metal.

This second model of the metal 20 can then be used for making a second mold of a metal of greater hardness and higher melting point than could be obtained directly from the original model. The second mold may be made, for instance, in the following manner:

The second model of spray metal 20 is, for example, clamped in and supported by a steel frame support 6 (Fig. 4), as described in connection with the first negative 5 (Fig. 3) in order to avoid possible distortion of the model while the metal of the mold is being sprayed thereon. For example, the model 20 may be inverted and seated in the recessed frame support 6, as shown in Fig. 4, and held therein by an upper clamping plate or frame 12a similar to frame 12, having preferably a sloping edge 14a and an inner diameter smaller than that of plate or frame 12 and preferably of proper size to retain the model 20 within the frame support 6. As in the case of preparing the second model, the lower side of the model, when placed in the frame support 6, is preferably also supported by a metal 16 or sand, or some other suitable material.

The model 20 is covered with a thin coating 24 (Fig. 4) of metal of relatively low melting point such as tin, cadmium or zinc. This coating may be applied by hot dipping or, preferably, by electro-plating and not only aids in the adherence of the metal of the negative or mold to the metal of the model but also facilitates separation of the two after the negative or mold is completed.

Assuming the model has been prepared by electro-plating a coating 24 of low melting point metal thereon, it is then sprayed with successive layers 26 of suitable higher melting point metal until a spray metal coating of the desired thickness has been produced. While spraying the coated model, the same being preferably clamped in a suitable frame, the layers 26 of sprayed metal will build up under the inclined edge 14a of the plate or frame 12a. The spray metal negative 26 is finally separated from the model 20 by melting the coating 24 of low melting point metal.

The model may be notched or grooved, if desired, as at 25, which notches or grooves are filled with low melting point metal. This additional amount of low melting point metal becomes fused and seeps in between the model and the negative or mold when they are heated and further facilitates separation.

In certain cases where extreme precaution is required to prevent distortion of the model or matrix while the metal of the negative or mold is being sprayed thereon, it may be desirable to cool the model while the metal of the negative or mold is so sprayed. This can be accomplished very readily by circulating a cooling medium through the lower portion of the frame support 6.

Figure 5:
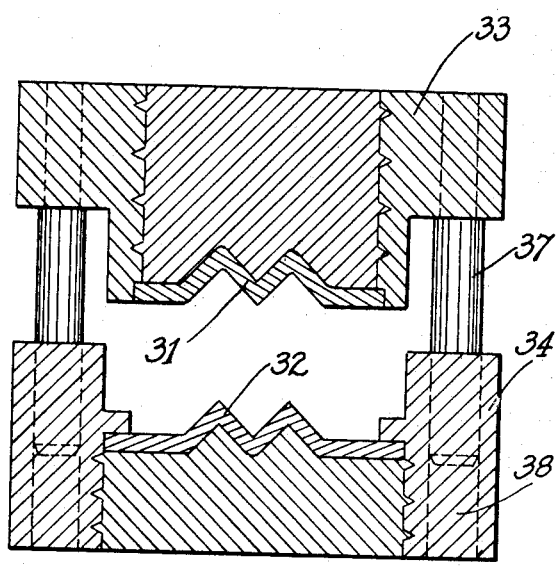
Fig. 5 is a cross-sectional side elevation of a two-part or separable mold.

In certain classes of molding, both surfaces of the molded article must be finished. In such cases, a two-part mold must be employed. In Fig. 5 there is illustrated a two-part mold of this character, both parts of the mold being made in accordance with the processes outlined above. Such a mold is particularly adaptable to the manufacture of articles of synthetic resins and may comprise two parts 31 and 32, both made by the spraying of high melting point metals upon a model, as previously outlined. Each of the portions of the mold is preferably supported in frames 33 and 34, respectively, which are backed with suitable material to give the necessary rigidity to the two sections of the mold. The two portions of the mold are provided with studs 37 and guides 38, respectively, to cause proper approach of the two sections of the mold when they are brought together. Where, as will appear from the specific embodiment illustrated in the drawing (Fig. 5), the surfaces of the mold portions 31 and 32 constitute substantial negatives of each other, they represent thus, one a negative and the other a duplicate of one and the same model surface.

Figure 6:
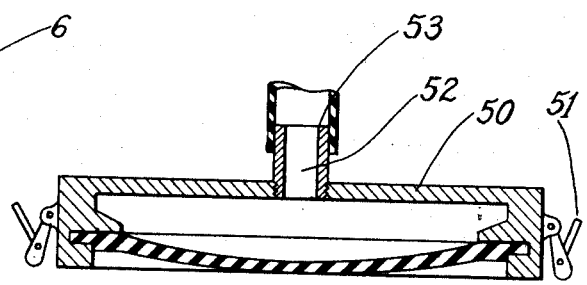
Fig. 6 is a cross-sectional side elevation of a structure for applying a metal foil to the surface of a model in accordance with the invention.

When the original model, due to the material of which it is made, will not permit the direct spraying of metal thereon, inter alia, because of the fact that sprayed particles of metal embed in the surface of the model, resulting in either a misshapen mold or in a mold having an undesirable finish, it is of advantage to first cover such model with a sheet of relatively thin metal foil such as tin foil and thereafter spray the foil coated model. Such foil, as for instance foil 46 (Fig. 6), may be pressed, such as by hand, into as close contact as possible with the model 1, after which the model thus coated may be placed in the lower portion 47 of a frame. Preferably, the tin foil is held on the model by a plaster collar, or the like 48, which extends around and beneath the model.

The tin foil is then forced into extremely close contact with the upper surface of the model such as by a flexible rubber diaphragm 49 held in the upper portion 50 of the frame which may be clamped to the lower portion by clamps 51. The rubber diaphragm is forced into tight contact against the upper portion of the mold by means of a fluid admitted under pressure between the upper side of the rubber diaphragm and the top of the upper frame portion 50 through an orifice 52 and a conduit 53. It has been found satisfactory to use pressures of the magnitude of about fifty pounds per square inch to get the desired contact of the metal foil with the upper surface of the mold. After the model has thus been prepared, it may be used for the production of a mold by metal spraying.

It will be obvious to those skilled in the art that molds may be produced in accordance with the foregoing much quicker than the usual weeks of time now required and at a cost materially less than heretofore. Accurate molds may be produced at a very low cost, which molds are wholly satisfactory and adequate for the reproduction of molded articles, even if such articles are desired for samples or small consumption rather than for mass production, in which case it was heretofore economically impossible to do this because of the expense in producing a mold.

The material of which a sprayed mold is to be made may be selected according to the conditions to which it is to be subjected or the use to which it is to be put. For example, aluminum or aluminum alloys, bronze or similar metals may be used if little strain is to be put on the mold or if the number of articles to be made therefrom is small. If, on the other hand, however, the mold is to be used for mass production, or if for any other reason it must be of harder material, such metals as steel, nickel, or chrome-nickel alloys, or the like may be used.

It will be apparent to those skilled in the art that minor variations and deviations from the foregoing processes as described may be indulged in without departing from the spirit and scope of this invention, as defined in the appended claims.

I claim:

1. Method of making a spray metal negative of relatively hard metal from a model the surface of which is non-metallic and does not permit the direct spraying with such metal, which comprises the steps of spraying a coating of metal of relatively low melting point on such model, said coating being strippably bonded to said model, separating said model from the spray metal negative thus formed, spraying a coating of metal of relatively higher melting point on said negative to form a spray metal duplicate of said model, separating said duplicate from said negative, spraying said duplicate with a relatively hard metal to form a second negative and separating said duplicate from said second negative.

2. Method of making a spray metal negative of relatively hard metal from a model the surface of which is non-metallic and does not permit the direct spraying with such metal, which comprises the steps of spraying a coating of metal of relatively low melting point on such model, said coating being strippably bonded to said model, separating said model from the spray metal negative thus formed, spraying a coating of metal of relatively higher melting point on said negative to form a spray metal duplicate of said model, heating said negative at least on its contacting surface with said duplicate to the melting point of said low melting point metal, recovering said duplicate, spraying said duplicate with a hard metal to form a second negative and separating said duplicate from said second negative.

3. Method in accordance with claim 2 in which said low melting point metal is at least one member selected from the group consisting of tin, zinc and cadmium.

4. In the method of making a spray metal negative of relatively hard metal from a model the surface of which is non-metallic and does not permit the direct spraying with such metal, the steps comprising spraying a coating of metal of relatively low melting point on such model, said coating being strippably bonded to said model, separating said model from the spray metal negative thus formed, spraying a coating of metal of relatively higher melting point on said negative to form a spray metal duplicate of said model and separating said duplicate and said negative by melting off the latter.

5. The steps in accordance with claim 4 in which said low melting point metal is at least one member selected from the group consisting of tin, zinc and cadmium.

6. Method of making a spray metal negative of relatively hard metal from a model the surface of which is non-metallic and does not permit the direct spraying with such metal which comprises the steps of spraying a coating of metal of relatively low melting point on such model, said coating being strippably bonded to said model, separating said model from the spray metal negative thus formed, spraying a coating of metal of relatively higher melting point on said negative to form a spray metal duplicate of said model, heating said negative at least on its contacting surface with said duplicate to the melting point of said low melting point metal, recovering said duplicate, applying a relatively thin coating of a low melting point metal to said duplicate, spraying said coated duplicate with a relatively hard metal of a higher melting point than said last mentioned coating metal to form a second negative and separating said duplicate from said second negative by melting said thin coating of low melting point metal.

MAX STÖSSEL.